United States Patent
Chang et al.

(10) Patent No.: US 8,583,108 B2
(45) Date of Patent: Nov. 12, 2013

(54) METHODS AND SYSTEM FOR DETECTING ROAMING LOCATION OF MOBILE NETWORK

(75) Inventors: Hsiao-Tse Chang, Taipei (TW); Chao-Chi Chang, Taipei (TW); Ta-Gang Chiou, Taipei (TW)

(73) Assignee: Groundhog Technologies Inc., Cambridge, MA (US)

( * ) Notice: Subject to any disclaimer, the term of this patent is extended or adjusted under 35 U.S.C. 154(b) by 153 days.

(21) Appl. No.: 12/932,064

(22) Filed: Feb. 16, 2011

(65) Prior Publication Data

US 2011/0212721 A1 Sep. 1, 2011

Related U.S. Application Data

(60) Provisional application No. 61/338,014, filed on Feb. 16, 2010.

(51) Int. Cl.
*H04W 4/00* (2009.01)

(52) U.S. Cl.
USPC ........ 455/432.1; 455/433; 455/405; 455/406; 455/423; 455/424

(58) Field of Classification Search
USPC .......................... 455/405, 406, 443, 423, 424
See application file for complete search history.

(56) References Cited

U.S. PATENT DOCUMENTS

| | | | |
|---|---|---|---|
| 5,884,169 A * | 3/1999 | Uchiyama et al. | 455/433 |
| 7,136,636 B1 | 11/2006 | Mclaughlin | |
| 7,945,241 B2 * | 5/2011 | Cai et al. | 455/406 |
| 8,369,234 B2 * | 2/2013 | Ha et al. | 370/252 |
| 2007/0243864 A1 | 10/2007 | Jaquet | |
| 2009/0227227 A1* | 9/2009 | Gosnell et al. | 455/405 |

FOREIGN PATENT DOCUMENTS

| | | |
|---|---|---|
| EP | 1 601 218 | 11/2005 |
| EP | 1 821 566 | 8/2007 |
| EP | 2 139 277 | 12/2009 |

* cited by examiner

*Primary Examiner* — David Q Nguyen (57) ABSTRACT

A method and system for detecting a roaming location of a mobile network is provided to detect the roaming location in a systematic and efficient way. The method first collects roaming call detail records (CDRs) of a subscriber of the mobile network which are generated when the subscriber roams to a roaming network and makes or receives corresponding roaming calls, and then finds at least one roaming CDR whose corresponding roaming call is occurred in a cell of the roaming network covering a registered address of the subscriber. Last, the method determines whether the registered address is the roaming location according to the found roaming CDR(s).

11 Claims, 8 Drawing Sheets

METHODS AND SYSTEM FOR DETECTING ROAMING LOCATION OF MOBILE NETWORK

BACKGROUND OF INVENTION

1. Field of the Invention

The present invention relates to mobile networks, and more particularly to a method and system for detecting a roaming location of a mobile network.

2. Description of the Prior Art

In mobile networks, roaming (and frequent roaming) locations, mostly caused by poor or no RF coverage or insufficient capacity of network equipments, are always a major concern to mobile operators. Since the RF signal quality is poor or even no RF coverage is present in the roaming location, the subscriber of a mobile network would roam out to another mobile network operated by a roaming partner. This may cause a revenue leak of a mobile operator to its roaming partner, and thus the mobile operators keep investing money and manpower in different ways to find out the roaming locations in their networks and solve them accordingly. However, most operators are still looking for a systematic and efficient way to deal with this problem.

Drive test is a common way used by the mobile operators to find out the roaming locations. Though the RF signal quality of the mobile operator and its roaming partner can be directly detected during the drive test period, the drive test still has many drawbacks. For example, the mobile operators need to spend a huge amount of testing equipments, time (e.g. several weeks may be spent for one round of drive test in a city) and manpower to perform the drive test and subsequent data analysis. In addition, the drive test is usually performed in non-busy hours to avoid traffic congestion, and is mainly performed in outdoor environment since the access to indoor buildings may be restricted. Therefore, the drive test may fail to detect the roaming location existed at indoor buildings or in busy hours.

SUMMARY OF INVENTION

It is therefore one objective of the present invention to provide a method and system for detecting a roaming location in a mobile network, thereby detecting the roaming location in a systematic and efficient way.

Another objective of the present invention is to provide a method and system for detecting a roaming location in a mobile network, thereby detecting the roaming location at indoor buildings or in busy hours.

In one embodiment of the present invention, a method for detecting a roaming location of a first mobile network is provided. The method comprises steps of: collecting a plurality of roaming call detail records (CDRs) of a subscriber of the first mobile network, wherein the roaming CDRs are generated when the subscriber roams to a second mobile network and makes or receives corresponding roaming calls; finding at least one of the roaming CDRs whose corresponding roaming call is made or received in a cell of the second mobile network covering a registered address, wherein the registered address is a location address that the subscriber registers to the first mobile network; and determining whether the registered address is the roaming location of the first mobile network according to the at least one of the roaming CDRs.

In another embodiment of the present invention, a method for detecting a roaming location of a first mobile network is provided. The method comprises steps of: collecting a plurality of roaming call detail records (CDRs) generated by a same cell of the second mobile network, wherein the roaming CDRs are generated when a plurality of subscribers of the first mobile network roam to the second mobile network and make or receive corresponding roaming calls, and each subscriber has a registered address which is a location address that the subscriber registers to the first mobile network; finding whether there is a spatial cluster formed by the registered addresses of at least two of the subscribers; and determining the roaming location according to the registered addresses of the spatial cluster.

In another embodiment of the present invention, a method for detecting a roaming location of a first mobile network is provided. The method comprises steps of: collecting a plurality of first call detail records (CDRs) of a subscriber of the first mobile network, wherein the first CDRs are generated when the subscriber makes or receives a plurality of first calls in the first mobile network; collecting a plurality of second CDRs of the subscriber, wherein the second CDRs are generated when the subscriber roams to a second mobile network and makes or receives a plurality of second calls; finding, according to the first and second CDRs, at least one of the second calls which is made or received within a time interval after one of the first calls is terminated; and determining the roaming location of the first mobile network according to a terminated location of the one of the first calls if the at least one of the second calls is found.

In another embodiment of the present invention, a method for detecting a roaming location of a mobile network is provided. The method comprises steps of: collecting a plurality of roaming call detail records (CDRs) generated when a plurality of international roamers roam into the mobile network and make or receive a plurality of corresponding roaming calls, wherein each of the roaming CDRs comprises an identifier of the international roamer who makes or receives the corresponding roaming call, an end cell identifier for indicating an end cell of the mobile network where the corresponding roaming call is ended at, a start time of the corresponding roaming call, an end time of the corresponding roaming call and a termination cause for indicating whether the corresponding roaming call is a dropped call; finding, according to the roaming CDRs, at least one of the international roamers who encounters the dropped call and does not make or receive another roaming call in the mobile network within a time interval after the dropped call; and determining the roaming location within the end cell indicated by the roaming CDR of the dropped call.

DETAILED DESCRIPTION

Figure 1:
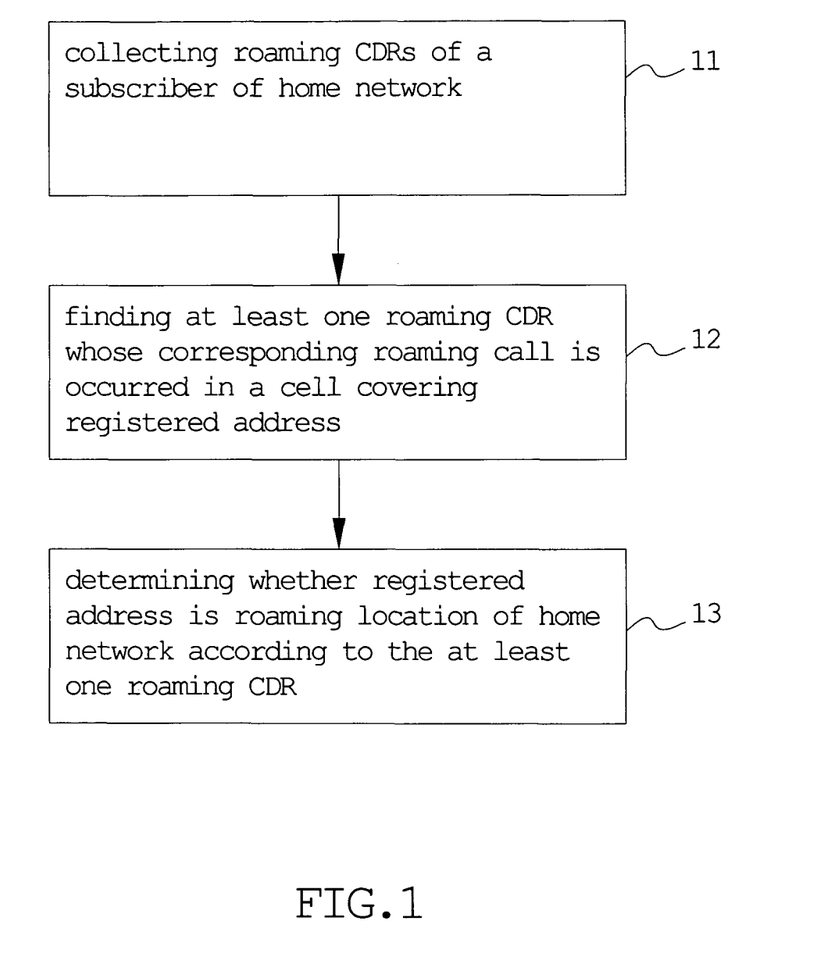
FIG. 1 is a flow chart of a method for detecting a roaming location of a mobile network according to a first embodiment of the present invention.

Reference will now to be made in detail to embodiments of the present invention, which are illustrated in the accompanying drawings. FIG. 1 is a flow chart of a method for detecting a roaming location of a mobile network according to a first embodiment of the present invention. The mobile network can be any kind of wireless network with a cellular architecture, such as GSM, cdmaOne, PHS, CDMA2000, UMTS, EVDO, LTE, WiMAX networks, etc. In the first embodiment, the roaming location is detected according to roaming call detail records (CDRs) of subscribers of the mobile network (i.e. the home network). When the subscriber roams to another mobile network (i.e. the roaming network) and makes or receives a roaming call (e.g. a phone call), the roaming network would generate a corresponding roaming CDR to serve as the basis for billing the home network. The roaming CDR typically includes following information: (1) a phone number of the subscriber (e.g. IMSI); (2) a start cell identifier for indicating a start cell of the roaming network where the corresponding roaming call is made or received at; (3) an end cell identifier for indicating an end cell of the roaming network where the corresponding roaming call is ended at; (4) a start time of the corresponding roaming call; and (5) an end time of the corresponding roaming call. In some mobile networks, the above item (5) is replaced by a time duration of the corresponding roaming call. The first embodiment can combine the roaming CDRs of each subscriber with his registered address so as to find out the roaming locations more precisely. The registered address is a location address (e.g. street, city, state, etc.) that the subscriber registers to the home network as part of the subscriber profile, and is usually used as the billing address. The basic concept of the first embodiment is as follows: the registered address, typically the home or office address of the subscriber, is usually the location that the subscriber makes or receives a call most frequently. On the other hand, by examining the start cell identifier of the roaming CDR, it can be determined which cell of the roaming network the corresponding roaming call is made or received in, i.e. the roaming location lies in the start cell indicated by the start cell identifier of the roaming CDR. Thus, if the start cell indicated by the start cell identifier of a roaming CDR covers the registered address of the subscriber, then it is possible that the subscriber makes or receives the roaming call in the registered address and thus the registered address is just the roaming location. If the amount of such roaming CDRs (i.e. its start cell identifier indicates a start cell covering the registered address) is larger, it can be more confirmed that the registered address is a roaming location or even a frequent roaming location. In this manner, the roaming location can be positioned more precisely since the registered address can reveal more detailed location information such as floor, street, etc.

Next, the first embodiment is described in detail with respect to FIG. 1. In step 11, a plurality of roaming CDRs of a subscriber of the home network are collected. The roaming CDRs can be provided by the roaming network. In step 12, at least one of the roaming CDRs, whose corresponding roaming call is occurred (made or received) in a cell of the roaming network covering the registered address of the subscriber, is found. Preferably, step 12 first generates a corresponding cell list for the registered address of the subscriber, where the cell list comprises at least one cell of the roaming network that covers the registered address. The cell list can be generated by looking up the coverage map of the roaming network, which displays the coverage area of each cell on a map. The registered address can be represented in terms of latitude and longitude by referring to Geographical Information System (GIS). If floor information is available in the registered address, the registered address can be represented more precisely in terms of latitude, longitude and altitude. Next, step 12 identifies the roaming CDR(s) whose start cell identifier(s) belongs to the cell list.

In step 13, it is determined whether the registered address is a roaming location of the home network according to the roaming CDR(s) found in step 12. Preferably, step 13 is executed according to the amount of the roaming CDR(s) found in step 12. For example, if the amount of the found roaming CDR(s) is larger than a threshold (which can be properly configured so as to exclude the accidental occurrence or meet different QoS requirements of the home network), then the registered address can be identified as the roaming location.

In the first embodiment, the coverage map of the roaming network is used to find whether a cell of the roaming network covers the registered address of the subscriber of the home network. Since the coverage map of the roaming network may not be available (e.g. it may be the trade secret of the roaming partner), drive test is the alternative way to estimate the cell tower locations of the roaming network, i.e. by using well-known positioning methods to process signal report data of the roaming network measured during the drive test. Once the cell tower locations are estimated, a rough coverage map of the roaming network can be derived accordingly. Alternatively, the second and third embodiments according to the present invention are provided below to detect the roaming location without using the coverage map of the roaming network.

Figure 2:
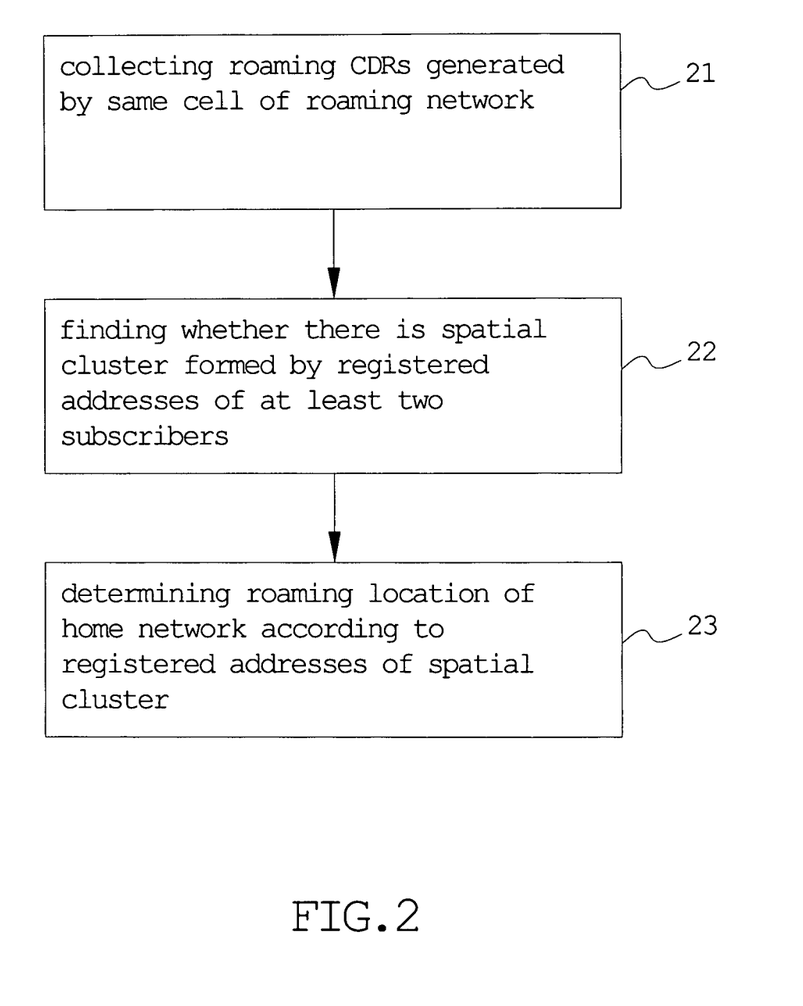
FIG. 2 is a flow chart of the method for detecting a roaming location of a mobile network according to a second embodiment of the present invention.

FIG. 2 is a flow chart of the method for detecting a roaming location of a mobile network (i.e. the home network) according to a second embodiment of the present invention. In the second embodiment, the roaming location is also detected according to roaming CDRs, but the CDR data is used in a different way from the first embodiment. Step 21 collects a plurality of roaming CDRs generated by a same cell of a roaming network. These roaming CDRs are generated when a plurality of subscribers of the home network roam to the roaming network and make or receive a plurality of corresponding roaming calls. Next, step 22 finds whether there is a spatial cluster formed by the registered addresses of at least two of the subscribers. For example, the registered addresses of the subscribers can be plotted on the GIS platform, so as to find if the spatial cluster is formed. Since the registered address of the subscriber is where (s)he makes or receives a call most frequently, if the roaming CDRs of the subscribers are generated by the same cell of the roaming network, and also if the registered addresses of the at least two of the subscribers form a spatial cluster, then it can be reasonably derived that the registered addresses in the spatial cluster are located in the above same cell of the roaming network and are also the locations where the at least two of subscribers make or receive the roaming calls. Thus, in step 23, the roaming location(s) of the home network is determined according to the registered addresses of the spatial cluster. For example, the registered addresses of the spatial cluster can be directly identified as the roaming locations, or the neighborhood of each registered address of the spatial cluster can also be considered as the possible roaming location or area.

Preferably, one or both of the below enhancing conditions can be added to upgrade the detection accuracy of the second embodiment: (1) in step 22, the amount of the roaming calls made or received by each of the at least two of subscribers should be larger than a first threshold. This condition can help to assure that the at least two of subscribers make or receive the roaming calls in their registered addresses; and (2) in step 22, the amount of the at least two of subscribers should be larger than a second threshold, that is, the number of the registered addresses in the spatial cluster is larger than the second threshold. This condition can help to assure that the registered addresses in the spatial cluster are located in the above same cell of the roaming network. Both the first and second thresholds can be configured according to practical needs.

Figure 3:
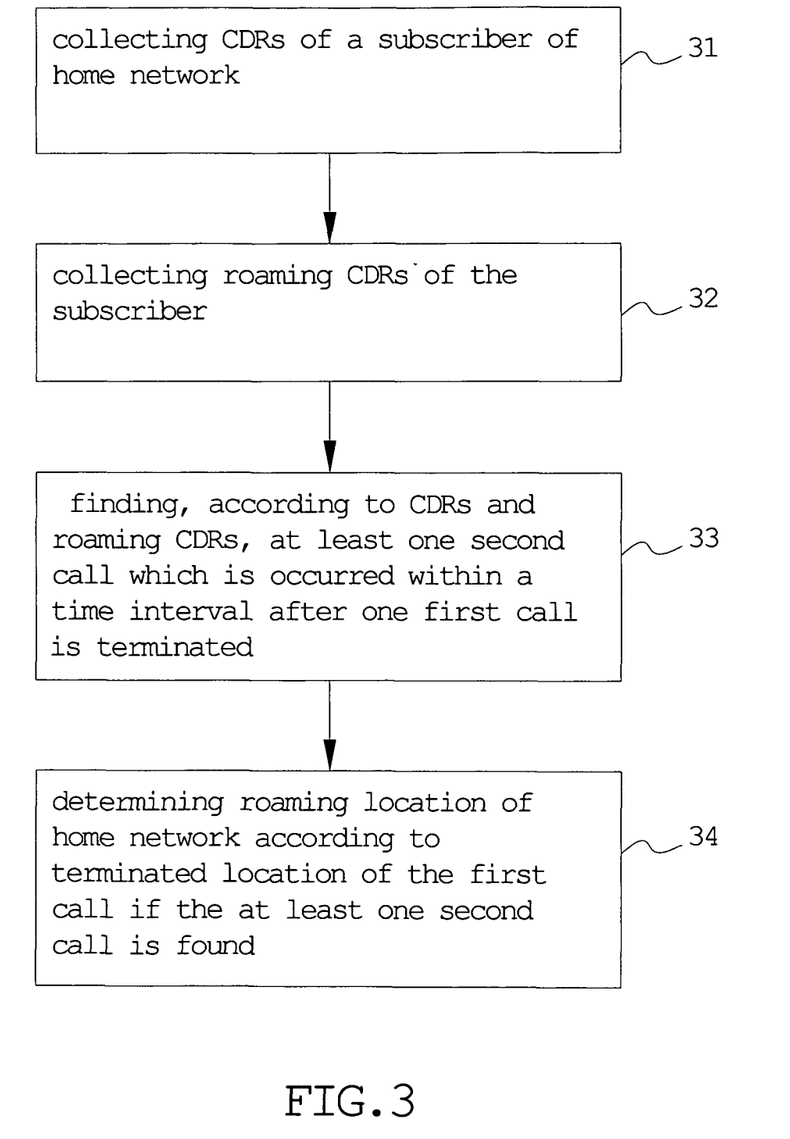
FIG. 3 is a flow chart of the method for detecting a roaming location of a mobile network according to a third embodiment of the present invention.

FIG. 3 is a flow chart of the method for detecting a roaming location of a mobile network (i.e. the home network) according to a third embodiment of the present invention. In the third embodiment, the roaming location is detected according to both CDRs and roaming CDRs generated by the home network and the roaming network respectively. In Step 31, a plurality of CDRs of a subscriber of the home network are collected. The CDRs are generated when the subscriber makes or receives non-roaming calls in the home network. In step 32, a plurality of roaming CDRs of the subscriber are collected. These roaming CDRs are generated when the subscriber roams to the roaming network and makes or receives roaming calls. Next, step 33 finds at least one of the roaming calls, which is occurred (i.e. made or received) within a time interval after one of the non-roaming calls is terminated, according to the CDRs and roaming CDRs collected in steps 31 and 32. The time interval is shorter than a configurable threshold, e.g. one minute, 30 seconds or less. When such a roaming call is found, it means that the subscriber makes or receives this roaming call very shortly after a previous non-roaming call is terminated. For example, the previous non-roaming call may be abnormally terminated due to poor or no RF coverage of the home network, and then the subscriber automatically roams to the roaming network to make or receive the roaming call. Since the start time of the roaming call is very close to the end time of the non-roaming call, it can be reasonably derived that both the originated location of the roaming call and the terminated location of the previous non-roaming call are equivalently the same. Thus, if the terminated location of the previous non-roaming call can be found, the originated location of the roaming call (i.e. the roaming location of the home network) can be determined.

Last, in step 34, the roaming location of the home network is determined according to an estimated terminated location of the non-roaming call terminated shortly before the roaming call found in step 33. There are two embodiments for estimating the terminated location of the non-roaming call. In one embodiment, if the non-roaming call is made or received in a cell covering the registered address of the subscriber, then the registered address can be estimated as the terminated location of the non-roaming call since the registered address is where the subscriber makes or receives the non-roaming call most frequently. Preferably, the below enhancing condition can be added to upgrade the estimation accuracy of this embodiment: the amount of the roaming calls found in step 33 should be larger than a threshold and also the non-roaming calls terminated shortly before these roaming calls should be made or received in a cell covering the registered address, so as to help to assure that the subscriber makes or receives these roaming calls at his registered address.

In another embodiment, the terminated location of the non-roaming call is estimated according to at least one mobile measurement report sent from the subscriber during the non-roaming call. Some positioning methods, such as time of arrival (TOA) method, time difference of arrival (TDOA) method, etc., can be applied to the related information included in the mobile measurement report, so as to estimate the terminated location of the non-roaming call. The positioning methods and mobile measurement report mentioned above are well known to those skilled in the art, and will not be described in detail here.

Compared with the drive test used in prior arts, the first, second and third embodiments disclosed above have the following advantages:

(1) Discover precise roaming locations with much less efforts: these three embodiments can detect the roaming location to an accuracy of street address level (i.e. the registered address of the subscriber), without need to spend lots of efforts as the drive test.

(2) Discover indoor roaming locations: the drive test fails to find indoor roaming locations since the access to indoor buildings may be restricted, while the roaming location detected by these three embodiments (i.e. the registered address) is usually an indoor location.

(3) Temporal advantage: the drive test collects data and discovers roaming locations only during the time period when the drive test is performed, while these three embodiments have no such temporal restriction, as long as there are CDR data generated during the time period to be analyzed.

(4) Spatial advantage: the drive test collects data and discovers roaming locations only in areas where the drive test is performed, while these three embodiments have no such spatial restriction, as long as there are CDR data associated with the area to be analyzed.

(5) Discover roaming locations caused by insufficient capacity of network equipments: the drive test is hard to discover the roaming locations caused by insufficient capacity of network equipments since the drive test is usually performed during non-busy hours. For example, the cell breathing effect in CDMA-based networks, i.e. the coverage of a cell with insufficient capacity shrinks with larger data traffic and swells with less data traffic, may cause roaming locations during busy hours. These three embodiments can detect such kind of insufficient coverage locations as long as the CDR data during the busy hours are available.

Since the first, second and third embodiments can provide precise roaming locations, especially indoor ones, the network operators will have better understanding of their networks' coverage issues, and then adopt different strategies to solve the discovered roaming locations. For example, if the discovered roaming location resides in an office building, the network operator can add a new site, such as a picocell, or install repeaters in proper locations to complete the coverage; if the found roaming location resides in a residential building, the network operator can recommend femtocell installation accordingly, or build a new site if necessary.

Figure 4:
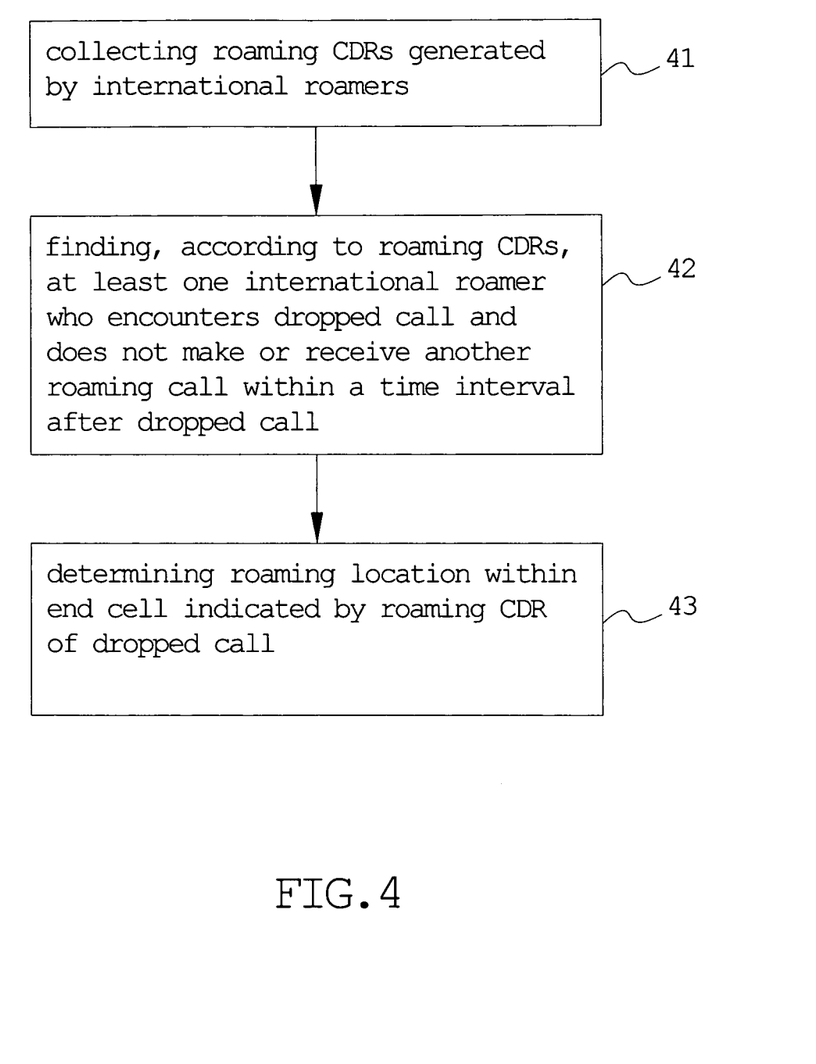
FIG. 4 is a flow chart of the method for detecting a roaming location of a mobile network according to a fourth embodiment of the present invention.

FIG. 4 is a flow chart of the method for detecting a roaming location of a mobile network according to a fourth embodiment of the present invention. The fourth embodiment is suitable to the case of international roaming. Generally, when an international roamer roams to a roaming network, he will keep staying in the same roaming network, but if he moves to a location with poor or no coverage of the current roaming network, he would roam to a new network having better coverage at this location. That is, this location is a roaming location of the current roaming network. Similarly, after roaming to the new network, the international roamer will keep staying therein and not roam back to the former network unless he encounters another coverage issue in the new network. Based on this characteristic of the international roamer, the fourth embodiment detects a roaming location of a mobile network according to the roaming CDRs generated when a plurality of international roamers roam into the mobile network and make or receive roaming calls (i.e. the mobile network is itself a roaming network).

In step 41, a plurality of such roaming CDRs are collected. Each such roaming CDR comprises an identifier of the international roamer (e.g. IMSI), an end cell identifier, a start time, an end time and a termination cause for recording how the roaming call is terminated. Next, step 42 finds at least one of the international roamers, who encounters a dropped roaming call and does not make or receive another roaming call in the mobile network within a time interval after the dropped roaming call, according to the roaming CDRs collected in step 41. The termination causes of the roaming CDRs can be used to find if there is an international roamer encountering a dropped roaming call. Then, if such an international roamer is found, the start and end times of the roaming CDRs can help to find whether he makes or receives another roaming call within a time interval after the dropped roaming call. Generally, people tend to make another call to continue the conversation soon after encountering a dropped call. Thus, if step 42 finds an international roamer who does not make or receive another roaming call in the current mobile network within the time interval after encountering a dropped roaming call, then it is very possible that, due to poor or no RF coverage of the current mobile network, the international roamer roams to another mobile network (and maybe makes or receives another roaming call in the another mobile network). The time interval can be configured as longer than a threshold, so as to make more sure that the international roamer has roamed to the another mobile network. Preferably, step 42 further checks whether the international roamer, who encounters the dropped roaming call, is excluded from a visitor location register (VLR) database of the mobile network after the dropped roaming call.

Last, step 43 determines the roaming location within the end cell indicated by the roaming CDR of the dropped roaming call. For example, the roaming location can be determined according to at least one mobile measurement report sent from the international roamer (who is found in step 42) during the dropped roaming call. Some positioning methods, such as TOA method, TDOA method, etc., can be applied to the related information included in the mobile measurement report so as to estimate the terminated location of the dropped roaming call, which is then identified as the roaming location of the mobile network.

Preferably, the below enhancing condition can be added to upgrade the detection accuracy of the fourth embodiment: the international roamer(s) found in step 42 should encounter a dropped roaming call in a same cell of the mobile network, and the amount of the international roamer(s) found in step 42 should be larger than a threshold. This condition can help to assure that there is a roaming location in this same cell, i.e. the end cell indicated by the roaming CDR of the dropped roaming call.

Please be noted that the fourth embodiment is especially suitable to the case which only has very little information available for detecting the roaming location of a mobile network. For example, the fourth embodiment only uses the roaming CDRs generated when international roamers roams into the mobile network itself, and no roaming CDRs of another network are available and no registered addresses of the international roamers are known.

Figure 5:
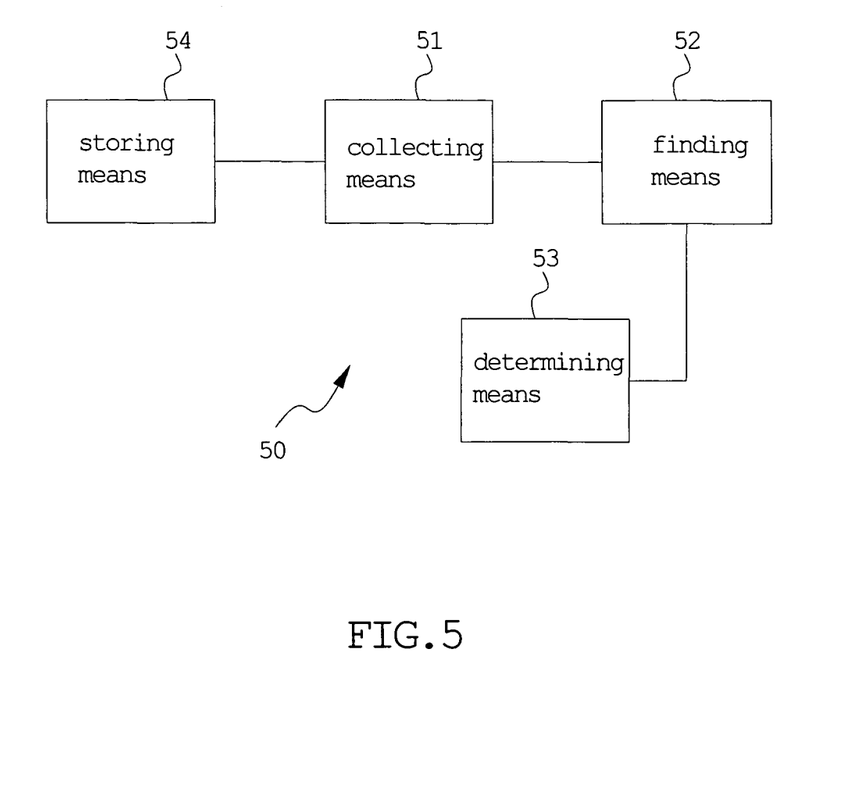
FIG. 5 is a block diagram of a system for detecting a roaming location of a mobile network according to a fifth embodiment of the present invention.

FIG. 5 is a block diagram of a system for detecting a roaming location of a mobile network (i.e. the home network) according to a fifth embodiment of the present invention, where the system 50 comprises a collecting means 51, a finding means 52, a determining means 53 and a storing means 54. The storing means 54, which can be a database, stores roaming CDRs provided by a roaming network. The collecting means 51 collects, from the storing means 54, a plurality of roaming CDRs of a subscriber of the home network. The roaming CDRs are generated when the subscriber roams to the roaming network and make or receive corresponding roaming calls. The finding means 52 finds at least one of the roaming CDRs whose corresponding roaming call is made or received in a cell of the roaming network covering a registered address of the subscriber. Preferably, the finding means 52 first generates a corresponding cell list for the registered address of the subscriber, where the cell list comprises at least one cell of the roaming network that covers the registered address. The cell list can be generated by looking up the coverage map of the roaming network, which displays the coverage area of each cell on a map. Then, the finding means 52 identifies the roaming CDR(s) whose start cell identifier(s) belongs to the cell list.

The determining means 53 determines whether the registered address is a roaming location of the home network according to the roaming CDR(s) found by the finding means 52. Preferably, the determining means 53 determines whether the registered address is the roaming location according to the amount of the roaming CDR(s) found by the finding means 52.

Figure 6:
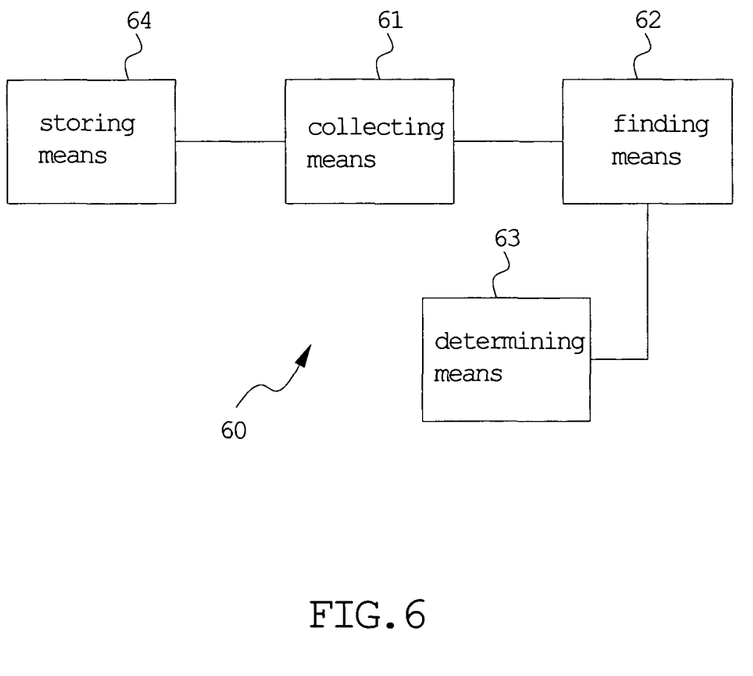
FIG. 6 is a block diagram of the system for detecting a roaming location of a mobile network according to a sixth embodiment of the present invention.

FIG. 6 is a block diagram of the system for detecting a roaming location of a mobile network (i.e. the home network) according to a sixth embodiment of the present invention, where the system 60 comprises a collecting means 61, a finding means 62, a determining means 63 and a storing means 64. The storing means 64, which can be a database, stores roaming CDRs provided by a roaming network. The collecting means 61 collects, from the storing means 64, a plurality of roaming CDRs generated by a same cell of the roaming network. These roaming CDRs are generated when a plurality of subscribers of the home network roam to the roaming network and make or receive a plurality of corresponding roaming calls. The finding means 62 finds there is a spatial cluster formed by the registered addresses of at least two of the subscribers. The determining means 63 determines the roaming location(s) of the home network according to the registered addresses of the spatial cluster. For example, the registered addresses of the spatial cluster can be directly identified as the roaming locations, or the neighborhood of each registered address of the spatial cluster can also be considered as the possible roaming location or area.

Figure 7:
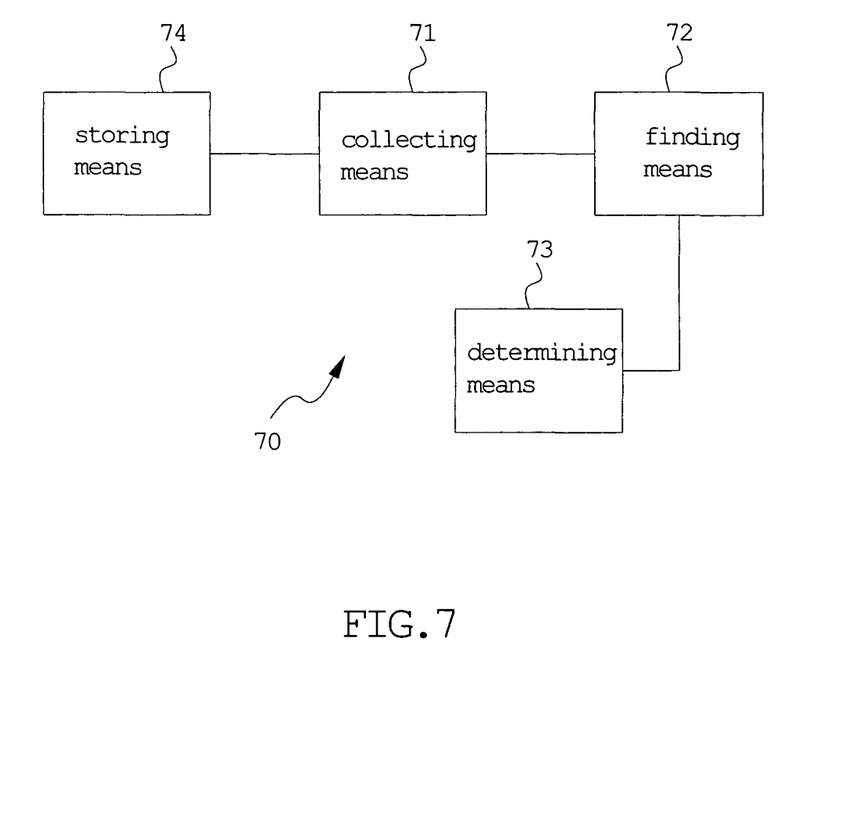
FIG. 7 is a block diagram of the system for detecting a roaming location of a mobile network according to a seventh embodiment of the present invention.

FIG. 7 is a block diagram of the system for detecting a roaming location of a mobile network (i.e. the home network) according to a seventh embodiment of the present invention, where the system 70 comprises a collecting means 71, a finding means 72, a determining means 73 and a storing means 74. The storing means 74, which can be a database, stores CDRs and roaming CDRs provided by the home network and a roaming network respectively. The collecting means 71 collects from the storing means 74 a plurality of CDRs of a subscriber of the home network, which are generated when the subscriber makes or receives non-roaming calls in the home network. The collecting means 71 further collects from the storing means 74 a plurality of roaming CDRs of the subscriber, which are generated when the subscriber roams to the roaming network and makes or receives roaming calls. The finding means 72 finds at least one of the roaming calls, which is occurred (i.e. made or received) within a time interval after one of the non-roaming calls is terminated, according to the CDRs and roaming CDRs collected by the collecting means 71. The time interval is shorter than a configurable threshold, e.g. one minute, 30 seconds or less. The determining means 73 then determines the roaming location of the home network according to an estimated terminated location of the non-roaming call terminated shortly before the roaming call found by the finding means 72. The determining means 73 can estimate the terminated location of the non-roaming call in two manners as described in the third embodiment above.

Figure 8:
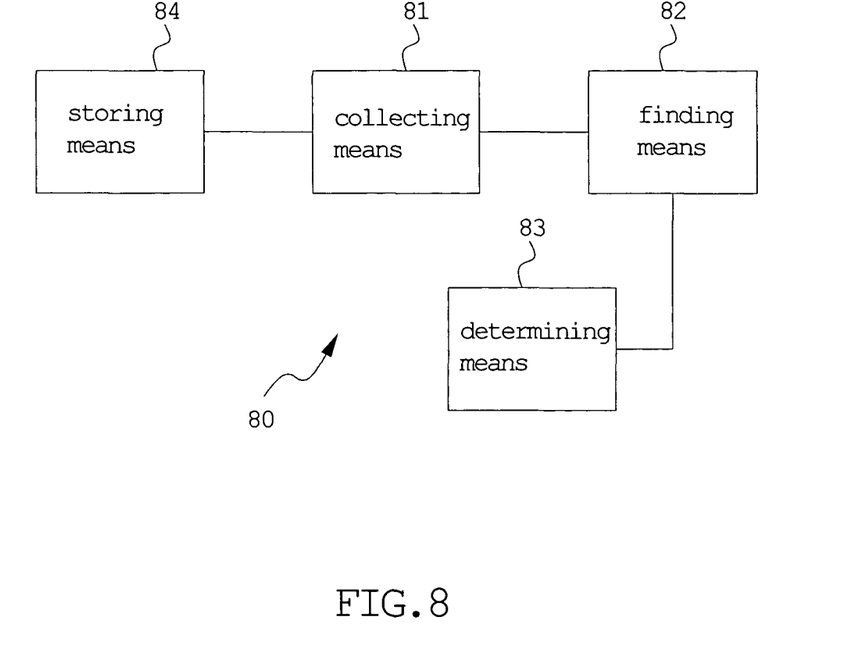
FIG. 8 is a block diagram of the system for detecting a roaming location of a mobile network according to an eighth embodiment of the present invention.

FIG. 8 is a block diagram of the system for detecting a roaming location of a mobile network according to an eighth embodiment of the present invention, where the system 80 comprises a collecting means 81, a finding means 82, a determining means 83 and a storing means 84. The storing means 84, which can be a database, stores roaming CDRs provided by the mobile network. The collecting means 81 collects from the storing means 84 a plurality of roaming CDRs generated when a plurality of international roamers roam into the mobile network and make or receive roaming calls (i.e. the mobile network is itself a roaming network). Each such roaming CDR comprises an identifier of the international roamer, an end cell identifier, a start time, an end time and a termination cause. The finding means 82 finds at least one of the international roamers, who encounters a dropped roaming call and does not make or receive another roaming call in the mobile network within a time interval after the dropped roaming call, according to the roaming CDRs collected by the collecting means 81. The time interval can be configured as longer than a threshold, so as to make more sure that the international roamer has roamed to the another mobile network. Preferably, the finding means 82 further checks whether the international roamer, who encounters the dropped roaming call, is excluded from a visitor location register (VLR) database (not shown in FIG. 8) of the mobile network after the dropped roaming call. The determining means 83 determines the roaming location within the end cell indicated by the roaming CDR of the dropped roaming call. For example, the roaming location can be determined according to at least one mobile measurement report sent from the international roamer (who is found by the finding means 82) during the dropped roaming call. The determining means 83 can apply some positioning methods, such as TOA method, TDOA method, etc., to the related information included in the mobile measurement report so as to estimate the terminated location of the dropped roaming call, which is then identified as the roaming location of the mobile network.

Please note that all of the collecting means, finding means, determining means and storing means described in the fifth, sixth, seventh and eighth embodiments can be realized by hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (SIP), or computer on module (COM). Alternatively, each of the systems 50, 60, 70 and 80 can be realized as a computer system, wherein the collecting means, finding means and determining means can be implemented in a processer, and the storing means can be implemented as a memory accessible by the processor.

It should be noted that all the above embodiments can also be applied to a mobile network comprising plural cellular network units other than cells, such as sectors (for CDMA networks), Node B (for UMTS networks), Access Points (for WiMAX networks), etc. The cellular network unit can also be finer than a cell if enough information is recorded. For example, if the cell identifier and Timing Advance value are both available, the cellular network unit can be "cell identifier+Timing Advance value", which is finer than a cell.

While the present invention has been shown and described with reference to the preferred embodiments thereof and the illustrative drawings, it should not be considered as limited thereby. Various possible modifications and alterations can be conceived by persons skilled without departing from the scope and the spirit of the present invention.

What is claimed is:

1. A method for detecting a roaming location of a first mobile network, said method being employed in a system for detecting a roaming location of a first mobile network, said system comprising a collecting means, a finding means, a determining means and a storing means; said method comprising steps of:

said collecting means collecting from said storing means a plurality of first call detail records (CDRs) of a subscriber of the first mobile network, wherein the first CDRs are generated when the subscriber makes or receives a plurality of first calls in the first mobile network;

said collecting means collecting from said storing means a plurality of second CDRs of the subscriber, wherein the second CDRs are generated when the subscriber roams to a second mobile network and makes or receives a plurality of second calls;

said finding means finding, according to the first and second CDRs, at least one of the second calls which is made or received within a time interval after one of the first calls is terminated; and said determining means determining the roaming location of the first mobile network according to a terminated location of the one of the first calls if the at least one of the second calls is found.

2. The method of claim 1, wherein the time interval is shorter than a threshold.

3. The method of claim 1, wherein the one of the first calls is terminated in a cell of the first mobile network covering a registered address which is a location address that the subscriber registers to the first mobile network; the terminated location of the one of the first calls is estimated according to the registered address.

4. The method of claim 3, wherein the registered address is a billing address of the subscriber.

5. The method of claim 3, wherein an amount of the at least one of the second calls is larger than a threshold.

6. The method of claim 1, wherein the terminated location of the one of the first calls is estimated according to at least one mobile measurement report sent from the subscriber during the one of the first calls.

7. The method of claim 1, wherein the one of the first calls is abnormally terminated.

8. A method for detecting a roaming location of a mobile network, said method being employed in a system for detecting a roaming location of a first mobile network, said system comprising a collecting means, a finding means, a determining means and a storing means; said method comprising steps of:

said collecting means collecting from said storing means a plurality of roaming call detail records (CDRs) generated when a plurality of international roamers roam into the mobile network and make or receive a plurality of corresponding roaming calls, wherein each of the roaming CDRs comprises an identifier of the international roamer who makes or receives the corresponding roaming call, an end cell identifier for indicating an end cell of the mobile network where the corresponding roaming call is ended at, a start time of the corresponding roaming call, an end time of the corresponding roaming call and a termination cause for indicating whether the corresponding roaming call is a dropped call;

said finding means finding, according to the roaming CDRs, at least one of the international roamers who encounters the dropped call and does not make or receive another roaming call in the mobile network within a time interval after the dropped call; and said determining means determining the roaming location within the end cell indicated by the roaming CDR of the dropped call.

9. The method of claim 8, wherein the finding step comprises:

finding the at least one of the international roamers who is excluded from a visitor location register (VLR) database of the mobile network after encountering the dropped call.

10. The method of claim 8, wherein the finding step finds the at least one of the international roamers who encounters the dropped call in a same cell of the mobile network, and an amount of the at least one of the international roamers is larger than a threshold.

11. The method of claim 8, wherein the roaming location is determined according to at least one mobile measurement report sent from the at least one of the international roamers during the dropped call.

* * * * *